United States Patent
Wang et al.

(10) Patent No.: US 11,487,803 B2
(45) Date of Patent: Nov. 1, 2022

(54) SYSTEMS AND METHODS FOR KEYWORD CATEGORIZATION

(71) Applicant: Walmart Apollo, LLC, Bentonville, AR (US)

(72) Inventors: Zigeng Wang, Coventry, CT (US); Cheng Jie, Sunnyvale, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 352 days.

(21) Appl. No.: 16/777,085

(22) Filed: Jan. 30, 2020

(65) Prior Publication Data
US 2021/0240742 A1 Aug. 5, 2021

(51) Int. Cl.
*G06F 16/35* (2019.01)
*G06N 20/00* (2019.01)
*G06Q 30/02* (2012.01)

(52) U.S. Cl.
CPC .......... *G06F 16/358* (2019.01); *G06F 16/355* (2019.01); *G06N 20/00* (2019.01); *G06Q 30/0283* (2013.01)

(58) Field of Classification Search
CPC ..... G06F 16/358; G06F 16/355; G06F 16/953
See application file for complete search history.

(56) References Cited

U.S. PATENT DOCUMENTS 9,911,140 B2 3/2018 Dixit et al.
2009/0171721 A1 7/2009 Lebaron et al.
(Continued)

OTHER PUBLICATIONS

Cer, Daniel et al., Universal Sentence Encoder, Google Research, arXiv:1803.11175v2 [cs.CL], 7 pages Apr. 12, 2018.
(Continued)

*Primary Examiner* — Mariela Reyes
*Assistant Examiner* — Fatima P Mina
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: receiving a set of keywords from a graphical user interface of an electronic device of a user; pre-processing at least one keyword of the set of keywords; receiving a hierarchical categorization; pre-processing at least one category of the hierarchical categorization; determining a respective similarity between each of the at least one keyword of the set of keywords and each of the at least one category of the hierarchical categorization; determining a respective confidence level of a most likely category in the hierarchical categorization for each of the at least one keyword of the set of keywords using the respective similarity between each of the at least one keyword of the set of keywords and each of the at least one category of the hierarchical categorization; ranking each of the at least one keyword of the set of keywords using a respective importance of each keyword of the set of keywords and the respective confidence level of the most likely category in the hierarchical categorization; and altering a respective arrangement of at least one of the at least one keyword on the graphical user interface on the electronic device of the user based on the ranking. Other embodiments are disclosed herein.

20 Claims, 6 Drawing Sheets

500

501 — Determining that a respective confidence level of one or more keywords is low and a respective importance of the one or more keywords is high 502 — Generating one or more artificial queries using the one or more keywords 503 — Facilitating displaying the one or more artificial queries on a graphical user interface 504 — Receiving an interaction with the one or more artificial queries 505 — Altering the hierarchical categorization based on the interaction

(56) References Cited

U.S. PATENT DOCUMENTS

| | | |
|---|---|---|
| 2009/0292677 A1 | 11/2009 | Kim |
| 2009/0299998 A1 | 12/2009 | Kim |
| 2012/0123863 A1 | 5/2012 | Kaul |
| 2018/0047039 A1 | 2/2018 | Beloi et al. |
| 2018/0268444 A1 | 9/2018 | Dong et al. |
| 2019/0098039 A1* | 3/2019 | Gates .................... G16H 50/70 |
| 2021/0149921 A1* | 5/2021 | Alexander .............. G06F 40/30 |

OTHER PUBLICATIONS

Peters, Matthew E., et al., Deep Contextual Word Representations, arXiv:1802.05365v2 [cs.CL], 15 pages Mar. 22, 2018.

Bengio, Y., Ducharme, R., Vincent, P., and Jauvin, C., A Neural Probabilistic Language Model, Journal of Machine Learning Research 3 (2003) pp. 1137-1155, 19 pages Feb. 2003.

* cited by examiner

500

501 – Determining that a respective confidence level of one or more keywords is low and a respective importance of the one or more keywords is high 502 – Generating one or more artificial queries using the one or more keywords 503 – Facilitating displaying the one or more artificial queries on a graphical user interface 504 – Receiving an interaction with the one or more artificial queries 505 – Altering the hierarchical categorization based on the interaction

601 – Keyword Receiving Module

602 – Keyword Pre-Processing Module

603 – Hierarchical Categorization Receiving Module

604 – Hierarchical Categorization Pre-Processing Module

605 – Similarity Determining Module

606 – Confidence Level Determining Module

607 – Ranking Module

608 – Arrangement Altering Module

FIG. 6

SYSTEMS AND METHODS FOR KEYWORD CATEGORIZATION

TECHNICAL FIELD

This disclosure relates generally to data structures, and more specifically to categorization and/or re-categorization of keywords in data structures.

BACKGROUND

The use and value of keywords and keyword sets in modern computer systems cannot be overstated. For example, keywords and keyword sets are integral to the operation of search algorithms, the training of machine learning algorithms, and/or the operation of automated search engine marketing systems. Keywords and keyword sets, though, are seen as nothing but blocks of text by conventional computer systems unless some type of hierarchical categorization gives context to the keyword or keyword set. Therefore, categorizing (or re-categorizing) keywords and/or sets of keywords presents a technical problem integral to the operation of modern computer systems.

In the past, many keywords and/or keyword sets have been categorized using data obtained from the operation of search engines. In these prior art systems, keywords and/or keyword sets are assigned to categories based on a classification of relevant results returned by the search engine. This, though, results in many keywords and/or keyword sets being mapped to a lowest level of a hierarchical categorization. This shunting of keywords into very narrow categorizations, in turn, leads to incorrect categorization of higher-level keywords and/or keyword sets that can be applicable to larger swaths of results. For example, a search for "video game system" can return "Xbox One" as a most relevant result. In this example, the prior art system would then classify the keyword set of "video game system" in the category of "Microsoft Video Game Systems," which is the lowest level of the hierarchical categorization for the Xbox One. This categorization, though, would omit other relevant results such as "Playstation 4," "Nintendo Switch," and many other video game related results. Moreover, this prior art classification system is unable to categorize keywords that return no results when searched or return results that have not been categorized in the hierarchical categorization. Therefore, there is a need for a more accurate classification system for keywords.

BRIEF DESCRIPTION OF THE DRAWINGS

To facilitate further description of the embodiments, the following drawings are provided in which:

FIG. 5 illustrates a flowchart for a method, according to certain embodiments;

FIG. 6 illustrates a representative block diagram of a system, according to an additional embodiment.

Figure 1:
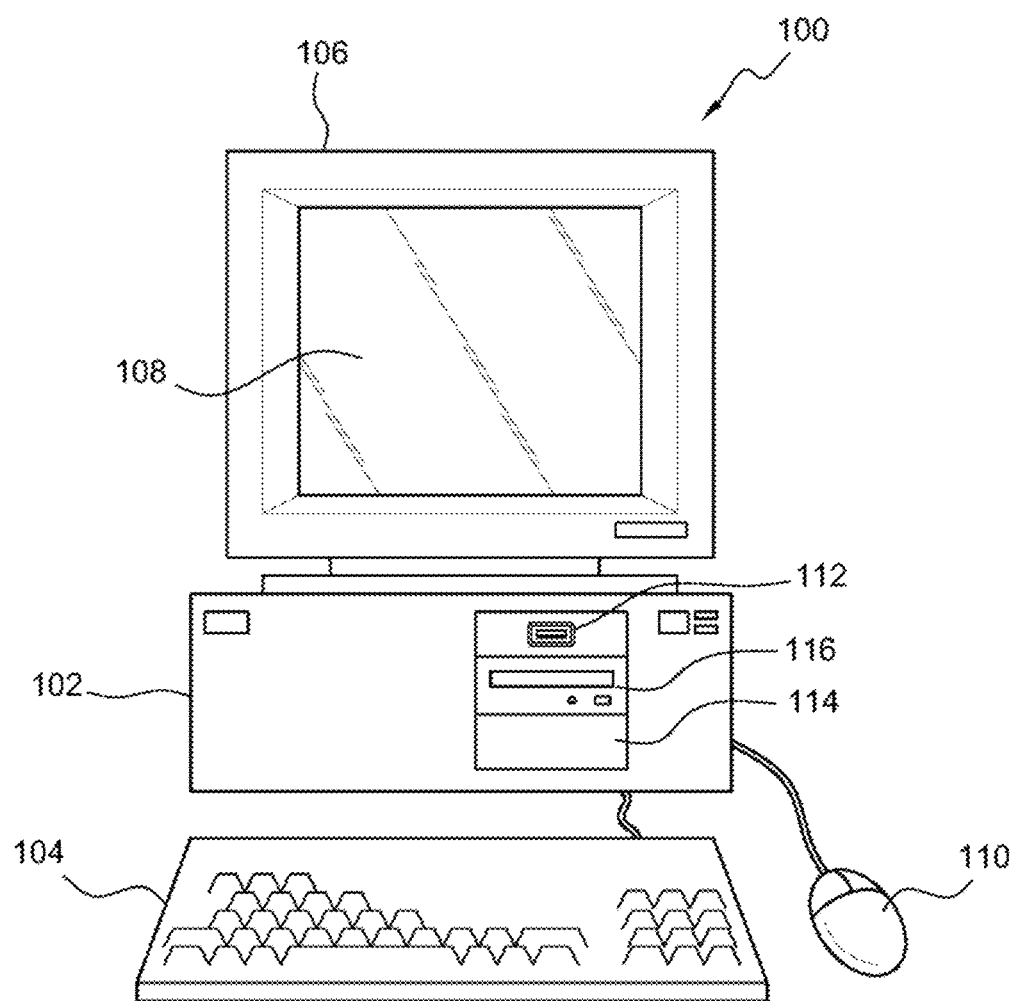
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving a set of keywords from a graphical user interface of an electronic device of a user; pre-processing at least one keyword of the set of keywords; receiving a hierarchical categorization; pre-processing at least one category of the hierarchical categorization; determining a respective similarity between each of the at least one keyword of the set of keywords and each of the at least one category of the hierarchical categorization; determining a respective confidence level of a most likely category in the hierarchical categorization for each of the at least one keyword of the set of keywords using the respective similarity between each of the at least one keyword of the set of keywords and each of the at least one category of the hierarchical categorization; ranking each of the at least one keyword of the set of keywords using a respective importance of each keyword of the set of keywords and the respective confidence level of the most likely category in the hierarchical categorization; and altering a respective arrangement of at least one of the at least one keyword on the graphical user interface on the electronic device of the user based on the ranking.

Various embodiments include a method. The method can be implemented via execution of computing instructions configured to run at one or more processors and configured to be stored at non-transitory computer-readable media The method can comprise receiving a set of keywords from a graphical user interface of an electronic device of a user; pre-processing at least one keyword of the set of keywords; receiving a hierarchical categorization; pre-processing at least one category of the hierarchical categorization; determining a respective similarity between each of the at least one keyword of the set of keywords and each of the at least one category of the hierarchical categorization; determining a respective confidence level of a most likely category in the hierarchical categorization for each of the at least one keyword of the set of keywords using the respective similarity between each of the at least one keyword of the set of keywords and each of the at least one category of the hierarchical categorization; ranking each of the at least one keyword of the set of keywords using a respective importance of each keyword of the set of keywords and the respective confidence level of the most likely category in the hierarchical categorization; and altering a respective arrangement of at least one of the at least one keyword on the graphical user interface on the electronic device of the user based on the ranking.

Figure 2:
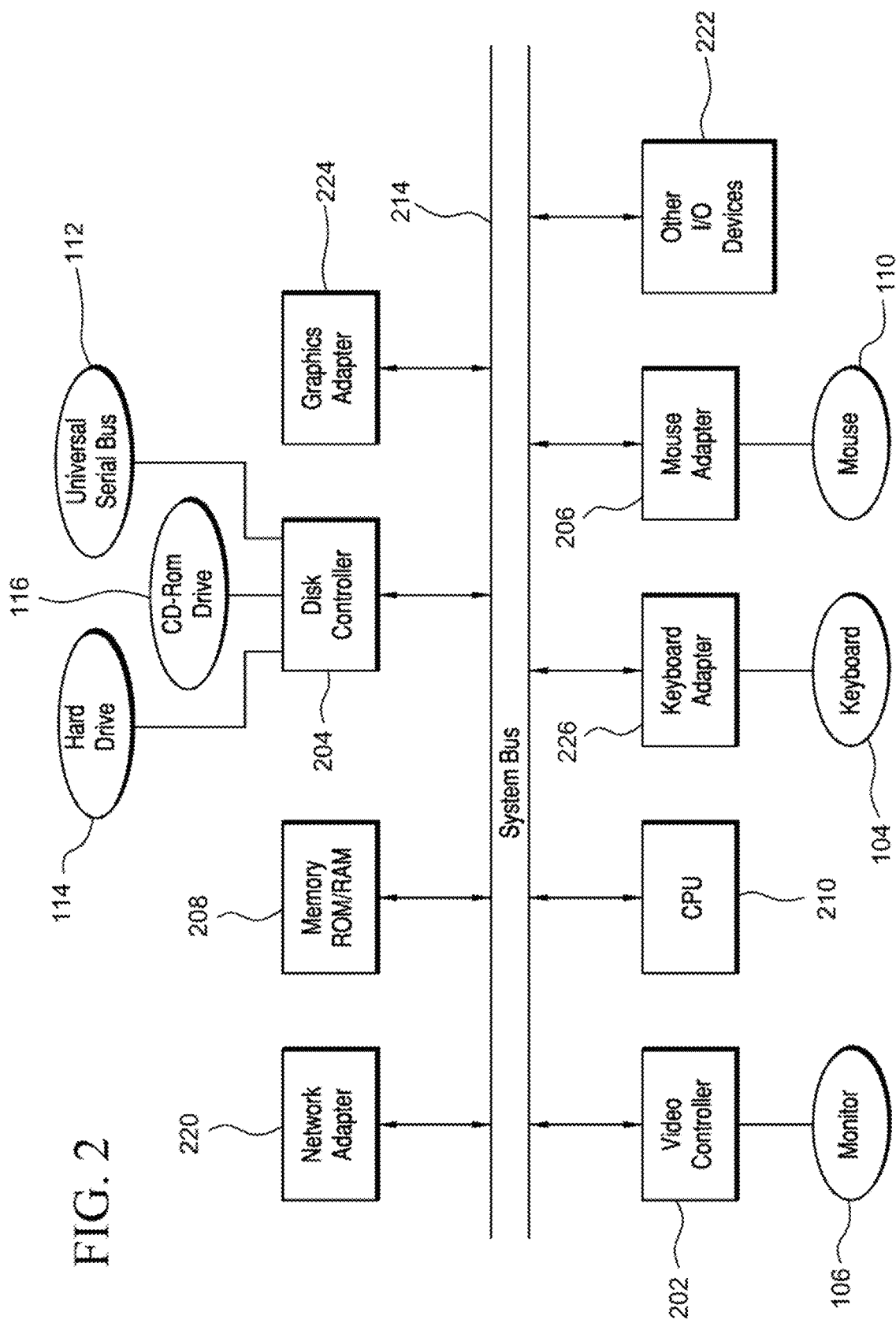
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory.

Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
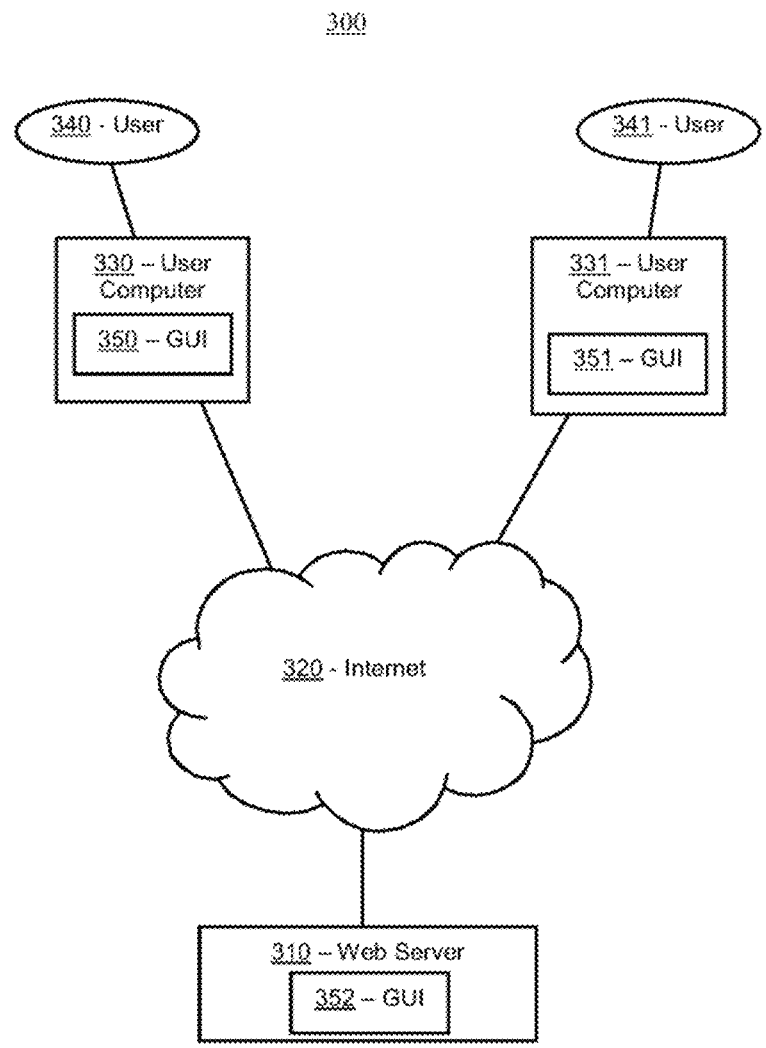
FIG. 3 illustrates a representative block diagram of a system, according to an embodiment.

Turning ahead in the drawings, FIG. 3 illustrates a block diagram of a system 300 that can be employed for keyword categorization, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 350, 351, 352. In the same or different embodiments, GUI 350, 351, 352 can be part of and/or displayed by user computers 330, 331, which also can be part of system 300. In some embodiments, GUI 350, 351, 352 can comprise text and/or graphics (image) based user interfaces. In the same or different embodiments, GUI 350, 351, 352 can comprise a heads up display ("HUD"). When GUI 350, 351, 352 comprises a HUD, GUI 350, 351, 352 can be projected onto glass or plastic, displayed in midair as a hologram, or displayed on monitor 106 (FIG. 1). In various embodiments, GUI 350, 351, 352 can be color or black and white. In many embodiments, GUI 350, 351, 352 can comprise an application running on a computer system, such as computer system 100, user computers 330, 331, and/or server computer 310. In the same or different embodiments, GUI 350, 351, 352 can comprise a website accessed through internet 320. In some embodiments, GUI 350, 351, 352 can comprise an eCommerce website. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, etc.

In some embodiments, web server 320 can be in data communication through Internet 330 with user computers (e.g., 330, 331). In certain embodiments, user computers 330, 331 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, web server 310 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310. In a similar manner, the processing module(s) and the memory storage module(s) can be local and/or remote to each other.

In many embodiments, web server 310 can be configured to communicate with one or more user computers 340 and 341. In some embodiments, user computers 340 and 341 also can be referred to as customer computers. In some embodiments, web server 310 can communicate or interface (e.g., interact) with one or more customer computers (such as user computers 340 and 341) through a network or internet 330. In some embodiments, internet 330 can be an intranet that is not open to the public. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 350, 351, respectively. In some embodiments, users 350, 351 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for a better classified corpus of keywords to use for many downstream applications (e.g., to build a better search algorithm, to train a more accurate machine learning algorithm, to more accurately bid on keyword advertisements, etc.). These techniques described herein can provide a significant improvement over conventional approaches of keyword classification, such as using search results, as described above.

In many embodiments, the techniques described herein can be used continuously at a scale that cannot be reasonably performed using manual techniques or the human mind. For example, the datasets used in the machine learning algorithms described below can be too large to be analyzed using manual techniques.

In a number of embodiments, the techniques described herein can solve a technical problem that arises only within the realm of computer networks, as search engines, machine learning algorithms, and search engine marketing, do not exist outside the realm of computer networks.

Figure 4:
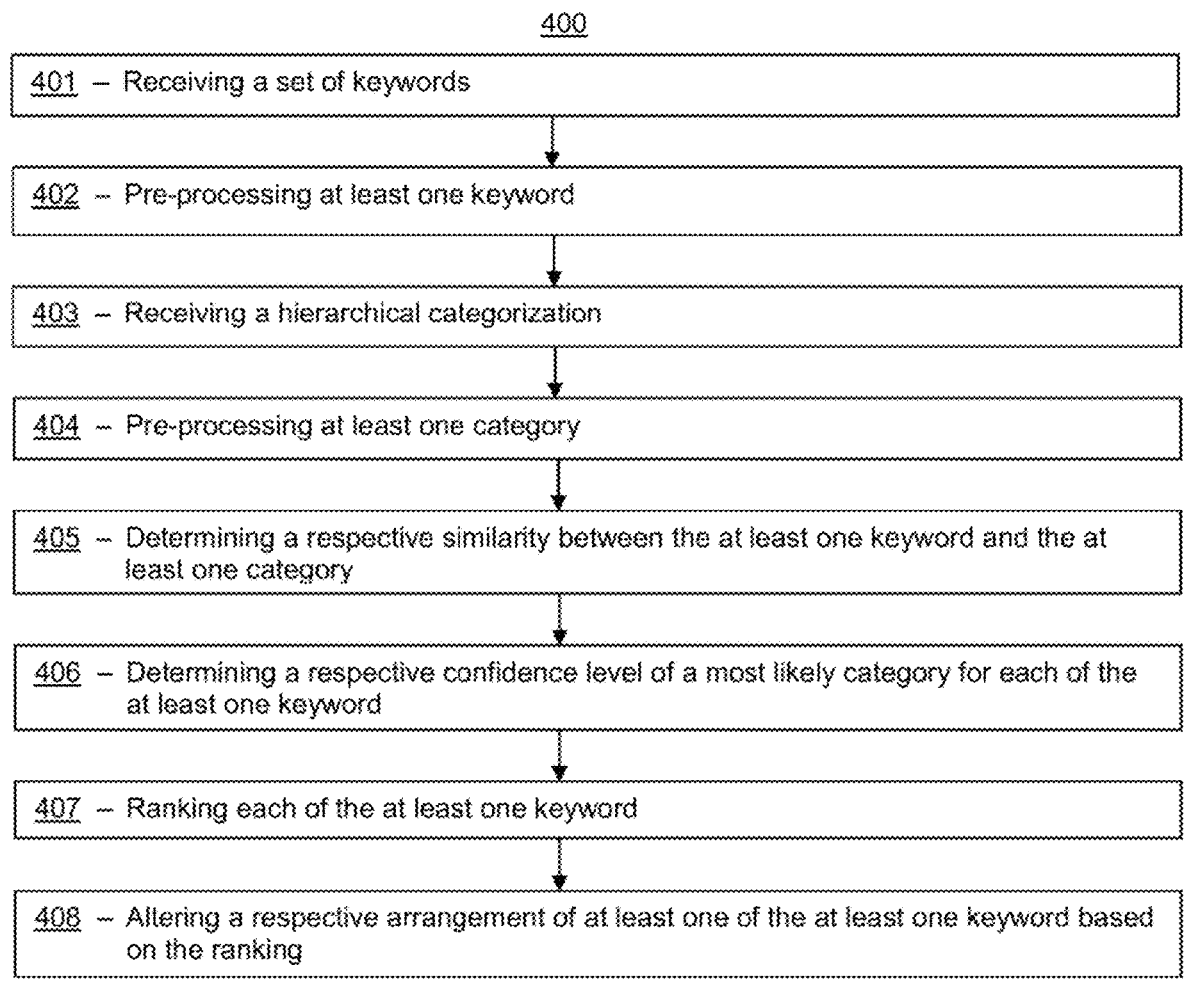
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3). The processing module(s) can be similar or identical to the processing module(s) described above with respect to computer system 100 (FIG. 1). In some embodiments, activities in method 400 can be performed in parallel. In some embodiments, activities 401, 402, and portions of activity 405 regarding generating embeddings for keywords can be performed in parallel with activities 403, 404, and portions of activity 405 regarding generating embeddings for a hierarchical categorization. In many embodiments, activities 401-405 can be referred to as an inference path and/or an inference arm of an algorithm. In these or other embodiments, activities 405-408 can be referred to as a learning path.

In many embodiments, method 400 can comprise an activity 401 of receiving a set of keywords from a graphical user interface of an electronic device of a user. In various embodiments, keywords can be created by harvesting keywords from search queries that resulted in one or more interactions with a GUI. In some embodiments, a graphical user interface can comprise GUI 350, 351, 352 (FIG. 3). In the same or different embodiments, a set of keywords can be purchased from a third party vendor, generated from search queries, and/or generated from machine learning labels.

In many embodiments, method 400 can comprise an activity 402 of pre-processing at least one keyword of the set of keywords. In these or different embodiments, pre-processing at least one keyword of the set of keywords can comprise altering a keyword, removing a keyword, re-ordering a series of keywords, and/or adding a new keyword. In some embodiments, pre-processing at least one keyword of the set of keywords can comprise removing irrelevant words in a keyword and/or set of keywords. In the same or different embodiments, irrelevant words in a keyword can comprise items not related to an item, a search query, or a machine learning label. In some embodiments, irrelevant words can be removed using a pre-build database of irrelevant words. In many embodiments, a machine learning classifier (or some other classification algorithm), can be used to identify irrelevant words. In these or other embodiments, pre-processing a keyword and/or keyword set can comprise one or more of: removing a stop word, removing a sentence fragment from a keyword, removing a retailer name, removing a variation of a retailer name, or removing an unnecessary symbol from the at least one keyword. In some embodiments, a stop word can comprise commonly used words (e.g., "the," "a," "an," and/or "in") that non-phrase search engines are generally programmed to ignore. In many embodiments, stop words can further comprise city names, county names, state names, country names, etc. For example, in an exemplary embodiment, a query of "tires in Stockton" can be pre-processed into "tires." In another example, "where can i buy shoe horn" can be pre-processed into "shoe horn." In various embodiments, a variation on a retailer name can be determined using an editing distance between a retailer name and its variation. In the same or different embodiments, an editing distance can be determined using a Wagner-Fischer dynamic programing algorithm, a. Levensthtein automata algorithm, and/or a polylogarithmic approximation algorithm. In these or other embodiments, a keyword or keyword set can be determined to be a variation of a retailer name when an editing distance between a retailer name and its variation is above a predetermined threshold. In many embodiments, the predetermined threshold can be set by an administrator of system 300 or web server 310. In these or other embodiments, a variation of a retailer name can be collected and stored in a database for faster retrieval at a later time. In some embodiments, an unnecessary symbol can comprise one or more of punctuation marks, mathematical operators, foreign letters, currency symbols, etc. In many embodiments, pre-processed keyword can be saved in one or more non-transitory storage modules associated with system 300 (FIG. 3).

In many embodiments, method 400 can comprise an activity 403 of receiving a hierarchical categorization. In the same or different embodiments, the hierarchical categorization can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, tags of an item can be determined based upon attributes of an item (e.g., properties of an item as described above). In the same or different embodiments, tags of an item can be provided by a seller of an item and/or by a user of an eCommerce website. In many embodiments, an item taxonomy can be received from a computer administered from or by system 300 (FIG. 3). In these or other embodiments, an item taxonomy can be received from a third party system or vendor.

In many embodiments, method 400 can comprise an activity 404 of pre-processing at least one category. In the same or different embodiments, the at least one category can comprise a classification level in a hierarchical categorization, as described with reference to activity 403. In these or other embodiments, categories can be pre-processed to add more information to the categories, add more context to the categories, and/or to construct a more meaningful reporting hierarchy representation. In some embodiments, pre-processing at least one category can comprise renaming partial directories. In the same or different embodiments, at least one category can be renamed to keep the categories in each level of the hierarchy hierarchically specific and semantically understandable. For example, a sub-category originally named "cards p2r" can be pre-processed to "cards print to retail." As another example, a category originally named "textile" can be pre-processed to "women textile" when its parent directory is "women exclusive brands." As a further example, a hierarchical categorization fragment of womens exclusive brands/textile/womens textile dresses and jumpsuits and be renamed as womens exclusive brands/womens textile/womens textile dresses and jumpsuits. As a final example, a hierarchical categorization fragment of PCs (i.e., personal computers) and PC gaming/lenovo can be renamed as PCs and PC gaming/lenovo pc In some embodiments, pre-processing at least one category of the hierarchical categorization can comprise renaming, adding, or removing a partial directory of the at least one category. For example, a "tier 1 monitors" subcategory can have "HP monitors," "Dell monitors," and "Samsung monitors" directories added to explain the "tier 1 monitors" subcategory in a more detailed way. In many embodiments, pre-processing at least one category can comprise inserting a category between two other categories. For example, sporting goods/wheel sports/ bikes adult can have a bike category inserted, thereby becoming sporting goods/wheel sports/bikes/bikes adult. In some embodiments, pre-processing at least one category can comprise creating a subcategory within a terminal category. For example, sporting goods/wheel sports can have "bike adult" or "bike kids" created within it, thereby becoming sporting goods/wheel sports/bikes/bikes adult or/bikes kids. In many embodiments, a pre-processed hierarchical categorization can be saved in one or more non-transitory storage modules associated with system 300 (FIG. 3).

In many embodiments, method 400 can comprise an activity 405 determining a respective similarity between at least one keyword and at least one category. In some embodiments, the at least one keyword can be pre-processed as described with respect to activity 402. In these or different embodiments, the at least one category can be pre-processed as described with respect to activity 404. In many embodiments, one or more sentence embedding algorithms can be used to generate vector representations of each keyword and each level of a hierarchical categorization. In some embodiments, these vector representations can be semantically correlated with each other. In many embodiments, open-source sentence embedding algorithms can be used to generate vector representations (e.g., a transformer based universal sentence encoder, a deep averaging network based universal sentence encoder, a embedding with neural probabilistic language model, etc.). In these or other embodiments, an embedding algorithm can be pre-trained or trained from the beginning using an item description database and/or a search term database.

In many embodiments, training a new sentence embedding algorithm can comprise training a machine learning algorithm on a large text corpus (e.g. Wikipedia articles, web news, web question-answer pages, product descriptions, etc.). In some embodiments, training a machine learning algorithm can comprise estimating internal parameters of a model configured to generate vector representations of each keyword and each level of a hierarchical categorization. In the same or different embodiments, a pre-trained machine learning algorithm can be used (as described above), and the pre-trained algorithm can be re-trained on the labeled training data. In some embodiments, the machine learning model can also consider both historical and dynamic input from newly published articles or new product descriptions. In this way, a machine learning algorithm can be trained iteratively as data from newly published articles or new product descriptions is added to a training data set. In many embodiments, a machine learning algorithm can be iteratively trained in real time as data is added to a training data set. In several embodiments, due to a large amount of data needed to create and maintain a training data set, a machine learning model can use extensive data inputs to generate vector representations of each keyword and each level of a hierarchical categorization. Due to these extensive data inputs, in many embodiments, creating, training, and/or using a machine learning algorithm configured to generate vector representations of each keyword and each level of a hierarchical categorization cannot practically be performed in a mind of a human being.

Generating embeddings from a hierarchical classification is advantageous because, due to their hierarchical nature, a certain category in a hierarchical categorization is within multiple vector representations from its own direct embedding, its augmented representations' embeddings, or an average of its potential descendant directories' embeddings. In some embodiments, pairwise cosine similarities between keyword vector representations and category vector representations are computed through direct matrix multiplication. In many embodiments, cosine similarities can correlate with show a semantic closeness of each keyword each category. In various embodiments a keyword's most relevant category is the one with a highest cosine similarity.

Due to the lack of labeled training data and the high volume of incoming new items, the system can be improved by incorporating an active learning technique. In this way, the system can discover potentially unknown and/or uncertain decisions, generate queries, and acquire the most beneficial information from a new information source to best enhance categorization performance. Therefore, in many embodiments, method 400 can comprise an activity 406 of determining a respective confidence level of a most likely category for each of the at least one keyword. In the same or different embodiments, a most likely category can be determined as described in activity 405. A confidence level can be determined in many different ways, as described in turn below.

In various embodiments, a confidence level can be determined using a similarity between each of the at least one keyword of the set of keywords, as determined in activity 405, and each of the at least one category of the hierarchical categorization, as described in activity 403. In these or other embodiments, a most likely category can be determined, as described in activity 405, and a second most likely category can be determined using similar techniques (e.g., by determining which category has a second highest cosine similarity). In these embodiments, a divergence can be determined between the most likely category and the second most likely category. Because a first most likely category and a second most likely category should be similar, the divergence should be minimal when a confidence level for the most likely category is high. In various embodiments, a minimal divergence can comprise a shared super-category of the first and second most likely categories.

In many embodiments, method 400 can comprise an activity 407 of ranking each keyword of one or more keywords. Some embodiments, a keyword can be ranked using an importance of the keyword. In various embodiments, an importance of a keyword can comprise a total number of clicks of the keyword and/or keywords related to it (e.g., keywords within the same level of a hierarchical categorization and/or a higher or lower level of the hierarchical categorization) within a certain period of time. In these or other embodiments, a divergence between a keyword's top two relevant categories based on the ranking can be used as a confidence level. This is because different levels of categories are constructed in a hierarchy, and therefore semantic vector representations of similar categories which share a same super-category should be similar as well. If there exists a divergence of a keyword's top two relevant categories, which are not sharing the same super-category, the keyword's categorization can be less accurate. Similar rankings can be performed with a variety of metrics, such as revenue per click, cost per click, etc.

In many embodiments, keywords can be grouped together based on their semantic similarity to create one or more clusters of keywords. In various embodiments, semantic similarity can be a metric defined over a set of keywords, where a distance between them is based on a likeness of their meaning (e.g., their semantic content) as opposed to similarity which can be estimated regarding their syntactical representation (e.g., their string format). In some embodiments, semantic similarity for keywords can be determined using a distance based agglomerative clustering algorithm. In some embodiments these clusters can then be ranked using the metrics and/or techniques described above and/or also be ranked by group size, average similarity, a sum of keyword clicks, a sum of keyword ad spend etc.

In many embodiments, method 400 can comprise an activity 408 of altering an arrangement of a keyword based on a ranking. In some embodiments, the arrangement of the keyword can be displayed on a GUI, such as GUI 350, 351, and/or 352 (FIG. 3). In various embodiments, altering an arrangement of a keyword can comprise bidding on one or more search engine advertisements.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as web server 310 (FIG. 3). The processing module(s) can be similar or identical to the processing module(s) described above with respect to computer system 100 (FIG. 1). In some embodiments, method 500 can be performed in additional to or as a part of method 400 (FIG. 4). In these or other embodiments, method 500 can be performed after activity 407 (FIG. 4). In various embodiments, method 500 can be performed completely independent of method 400 (FIG. 4).

In many embodiments, method 500 can comprise an activity 501 of determining that a confidence level of one or more keywords is low and a respective importance is high. In some embodiments, a confidence level of one or more keywords can comprise a confidence level as determined in activities 405 and/or 406 (FIG. 4). In many embodiments, a confidence level of a keyword can be considered low when a semantic similarity of the keyword and its predicted category is low and/or its top category is diverged.

In many embodiments, method 500 can comprise an activity 502 of generating one or more artificial queries using one or more keywords. In these or other embodiments, the one or more keywords can be keywords determined in activity 501 to be of high importance and low confidence. In some embodiments, a machine learning algorithm can generate the one or more artificial queries. In various embodiments, one or more artificial queries can be generated by an administrator of system 300 (FIG. 3). In many embodiments, one or more artificial queries can be configured to increase acquire potential categories for those keywords in the hierarchical categorization. For example, "305/35r24" is a specific keyword related to "tire" category, but a semantic similarity between keyword "305/35r24" and category "tire" is low, which can lead to inaccurate categorization of "305/35r24." An artificial query will correctly assign a category of the keyword "305/35r24" as "tire." Further, "305/35r24" will become an augmented representation of category "tire, thus allowing keywords similar to "305/35r24" (e.g. "205/55R16", "195/65R15", "215/55R17") to be categorized into the "tire" category.

In many embodiments, method 500 can comprise an activity 503 of facilitating displaying one or more artificial queries on a GUI. In many embodiments, the GUI can comprise GUI 350, 351, and/or 352 (FIG. 3).

In many embodiments, method 500 can comprise an activity 504 of receiving an interaction with one or more artificial queries. In many embodiments, the interaction can be received via a GUI as described in activity 503. In some embodiments, an interaction with an artificial query can be positive and a new category can be adopted for the keyword. In some embodiments, an interaction with an artificial query can be negative and a new category can be rejected for the keyword.

In many embodiments, method 500 can comprise an activity 505 of altering a hierarchical categorization based on an interaction with one or more artificial queries. In some embodiments, the interaction can be the same as described in activity 504. In various embodiments, the one or more artificial queries can be used to alter a hierarchical categorization, as described with reference to activity 404. In some embodiments, altering a hierarchical categorization can comprise adopting a new category for a keyword, as described above. In many embodiments, an altered hierarchical categorization can be saved in one or more non-transitory storage modules associated with system 300 (FIG. 3).

Turning ahead in the drawings, FIG. 6 illustrates a block diagram of a system 600 that can be employed for behavior based messaging. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600.

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 600 can comprise non-transitory memory storage module 601. Memory storage module 601 can be referred to as keyword receiving module 601. In many embodiments, keyword receiving module 601 can store computing instructions configured to run on one or more processing modules and perform one or more acts of method 400 (FIG. 4) (e.g., activity 401 (FIG. 4)).

In many embodiments, system 600 can comprise non-transitory memory storage module 602. Memory storage module 602 can be referred to as keyword pre-processing module 602. In many embodiments, keyword pre-processing module 602 can store computing instructions configured to run on one or more processing modules and perform one or more acts of method 400 (FIG. 4) (e.g., activity 402 (FIG. 4)).

In many embodiments, system 600 can comprise non-transitory memory storage module 603. Memory storage module 603 can be referred to as hierarchical categorization receiving module 603. In many embodiments, hierarchical categorization receiving module 603 can store computing instructions configured to run on one or more processing modules and perform one or more acts of method 400 (FIG. 4) (e.g., activity 403 (FIG. 4)).

In many embodiments, system 600 can comprise non-transitory memory storage module 604. Memory storage module 604 can be referred to as hierarchical categorization pre-processing module 604. In many embodiments, hierarchical categorization pre-processing module 604 can store computing instructions configured to run on one or more processing modules and perform one or more acts of method 400 (FIG. 4) (e.g., activity 404 (FIG. 4)).

In many embodiments, system 600 can comprise non-transitory memory storage module 605. Memory storage module 605 can be referred to as similarity determining module 605. In many embodiments, similarity determining module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as confidence level determining module 606. In many embodiments, confidence level determining module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as ranking module 607. In many embodiments, ranking module 607 can store computing instructions configured to run on one or more processing modules and perform one or more acts of method 400 (FIG. 4) (e.g., activity 407 (FIG. 4)).

In many embodiments, system 600 can comprise non-transitory memory storage module 608. Memory storage module 608 can be referred to as arrangement altering module 608. In many embodiments, arrangement altering module 608 can store computing instructions configured to run on one or more processing modules and perform one or more acts of method 400 (FIG. 4) (e.g., activity 408 (FIG. 4)).

Figure 7:
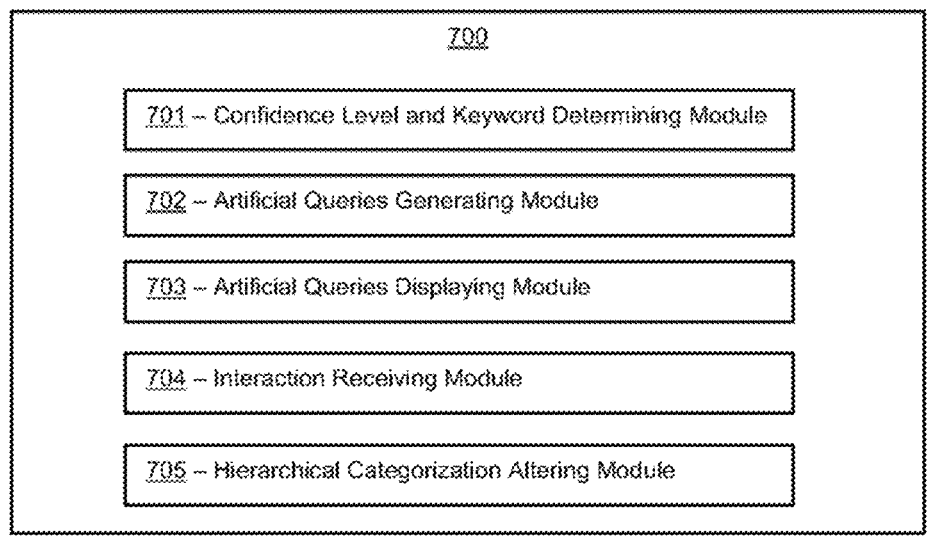
FIG. 7 illustrates a representative block diagram of a system, according to an additional embodiment.

Turning ahead in the drawings, FIG. 7 illustrates a block diagram of a system 700 that can be employed for behavior based messaging. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as confidence level and keyword determining module 701. In many embodiments, confidence level and keyword determining module 701 can store computing instructions configured to run on one or more processing modules and perform one or more acts of method 500 (FIG. 5) (e.g., activity 501 (FIG. 5)).

In many embodiments, system 700 can comprise non-transitory memory storage module 702. Memory storage module 702 can be referred to as artificial queries generating module 702. In many embodiments, artificial queries generating module 702 can store computing instructions configured to run on one or more processing modules and perform one or more acts of method 500 (FIG. 5) (e.g., activity 502 (FIG. 5)).

In many embodiments, system 700 can comprise non-transitory memory storage module 703. Memory storage module 703 can be referred to as artificial queries displaying module 703. In many embodiments, artificial queries displaying module 703 can store computing instructions configured to run on one or more processing modules and perform one or more acts of method 500 (FIG. 5) (e.g., activity 503 (FIG. 5)).

In many embodiments, system 700 can comprise non-transitory memory storage module 704. Memory storage module 704 can be referred to as interaction receiving module 704. In many embodiments, interaction receiving module 704 can store computing instructions configured to run on one or more processing modules and perform one or more acts of method 500 (FIG. 5) (e.g., activity 504 (FIG. 5)).

In many embodiments, system 700 can comprise non-transitory memory storage module 705. Memory storage module 705 can be referred to as hierarchical categorization altering module 705. In many embodiments, hierarchical categorization altering module 705 can store computing instructions configured to run on one or more processing modules and perform one or more acts of method 500 (FIG. 5) (e.g., activity 505 (FIG. 5)).

Although systems and methods for keyword categorization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to and perform functions comprising:
receiving a set of keywords from a graphical user interface of an electronic device of a user;
pre-processing at least one keyword of the set of keywords;
receiving a hierarchical categorization;
pre-processing at least one category of the hierarchical categorization;
determining a respective similarity between each of the at least one keyword of the set of keywords and each of the at least one category of the hierarchical categorization;
determining a respective first confidence level of a respective most likely category in the hierarchical categorization for each of the at least one keyword of the set of keywords using the respective similarity between each of the at least one keyword of the set of keywords and each of the at least one category of the hierarchical categorization;
ranking each of the at least one keyword of the set of keywords using a respective importance of each keyword of the set of keywords and the respective first confidence level of the respective most likely category in the hierarchical categorization;
altering a respective arrangement of at least one of the at least one keyword on the graphical user interface on the electronic device of the user based on the ranking;
determining that (i) a respective second confidence level of one or more keywords of the set of keywords is low when a semantic similarity of a respective top category of the one or more keywords of the set of keywords and the respective most likely category thereof is diverged, and (ii) the respective importance of the one or more keywords of the set of keywords is high when a divergence of the respective most likely category is minimal;
generating, by a machine learning algorithm, one or more artificial queries using the one or more keywords of the set of keywords, wherein the one or more artificial queries increase potential categories for the one or more keywords of the set of keywords in the hierarchical categorization, and wherein each artificial query of the one or more artificial queries correctly assigns a respective category of each keyword of the one or more keywords;
facilitating displaying the one or more artificial queries on the graphical user interface of the electronic device of the user;
receiving, from the graphical user interface of the electronic device of the user, an interaction with the one or more artificial queries; and
altering the hierarchical categorization based on the interaction with the one or more artificial queries.

2. The system of claim 1, wherein pre-processing the at least one keyword of the set of keywords comprises at least one of:
removing a stop word from the at least one keyword;
removing a retailer name from the at least one keyword;
removing a variation of the retailer name from the at least one keyword; or
removing an unnecessary symbol from the at least one keyword.

3. The system of claim 1, wherein pre-processing the at least one category of the hierarchical categorization comprises at least one of:
renaming a partial directory of the at least one category;
creating a subcategory within a terminal category of the at least one category; or
inserting a category between two other categories in the hierarchical categorization.

4. The system of claim 1, wherein determining the respective similarity between each of the at least one keyword of the set of keywords and each of the at least one category of the hierarchical categorization comprises:
using a sentence embedding algorithm to generate:
a respective first vector representation of each of the at least one keyword of the set of keywords; and
a respective second vector representation of each of the at least one category of the hierarchical categorization.

5. The system of claim 4, wherein determining the respective similarity between each of the at least one keyword of the set of keywords and each of the at least one category of the hierarchical categorization further comprises:
  determining a respective pairwise cosine similarity between the respective first vector representation of each of the at least one keyword of the set of keywords and the respective second vector representation of each of the at least one category of the hierarchical categorization; and
  when a particular one of the respective pairwise cosine similarity between a particular one of the respective first vector representation of a particular one of the at least one keyword of the set of keywords and a particular one of the respective second vector representation of a particular one of the at least one category of the hierarchical categorization is a highest one of the respective pairwise cosine similarity, determining that the particular one of the at least one category of the hierarchical categorization is the respective most likely category for the particular one of the at least one keyword of the set of keywords.

6. The system of claim 1, wherein the respective importance of each keyword of the set of keywords comprises at least one of:
  revenue per click within a predefined time period for the keyword;
  cost per click within a predefined time period or the keyword; or
  total number of clicks within a predefined time period for the keyword.

7. The system of claim 1, wherein ranking each of the at least one keyword of the set of keywords comprises:
  grouping each of the at least one keyword of the set of keywords with semantically similar keywords to create one or more clusters of keywords; and
  ranking the one or more clusters of keywords.

8. The system of claim 7, wherein grouping each of the at least one keyword of the set of keywords comprises:
  using a distance based agglomerative clustering algorithm.

9. The system of claim 1, wherein determining the respective first confidence level of the respective most likely category comprises:
  determining a respective pairwise cosine similarity between a respective first vector representation of each of the at least one keyword of the set of keywords and a respective second vector representation of each of the at least one category of the hierarchical categorization.

10. The system of claim 9, wherein determining the respective first confidence level of the respective most likely category further comprises:
  determining a divergence of (1) the respective most likely category in the hierarchical categorization for each of the at least one keyword of the set of keywords and (2) a second respective most likely category in the hierarchical categorization for each of the at least one keyword of the set of keywords.

11. A method being implemented via execution of computing instructions configured to run on one or more processors and stored at one or more non-transitory computer-readable media, the method comprising:
  receiving a set of keywords from a graphical user interface of an electronic device of a user;
  pre-processing at least one keyword of the set of keywords;
  receiving a hierarchical categorization;
  pre-processing at least one category of the hierarchical categorization;
  determining a respective similarity between each of the at least one keyword of the set of keywords and each of the at least one category of the hierarchical categorization;
  determining a respective first confidence level of a respective most likely category in the hierarchical categorization for each of the at least one keyword of the set of keywords using the respective similarity between each of the at least one keyword of the set of keywords and each of the at least one category of the hierarchical categorization;
  ranking each of the at least one keyword of the set of keywords using a respective importance of each keyword of the set of keywords and the respective first confidence level of the respective most likely category in the hierarchical categorization;
  altering a respective arrangement of at least one of the at least one keyword on the graphical user interface on the electronic device of the user based on the ranking;
  determining that (i) a respective second confidence level of one or more keywords of the set of keywords is low when a semantic similarity of a respective top category of the one or more keywords of the set of keywords and the respective most likely category thereof is diverged, and (ii) the respective importance of the one or more keywords of the set of keywords is high when a divergence of the respective most likely category is minimal;
  generating, by a machine learning algorithm, one or more artificial queries using the one or more keywords of the set of keywords, wherein the one or more artificial queries increase potential categories for the one or more keywords of the set of keywords in the hierarchical categorization, and wherein each artificial query of the one or more artificial queries correctly assigns a respective category of each keyword of the one or more keywords;
  facilitating displaying the one or more artificial queries on the graphical user interface of the electronic device of the user;
  receiving, from the graphical user interface of the electronic device of the user, an interaction with the one or more artificial queries; and
  altering the hierarchical categorization based on the interaction with the one or more artificial queries.

12. The method of claim 11, wherein pre-processing the at least one keyword of the set of keywords comprises at least one of:
  removing a stop word from the at least one keyword;
  removing a retailer name from the at least one keyword;
  removing a variation of the retailer name from the at least one keyword; or
  removing an unnecessary symbol from the at least one keyword.

13. The method of claim 11, wherein pre-processing the at least one category of the hierarchical categorization comprises at least one of:
  renaming a partial directory of the at least one category;
  creating a subcategory within a terminal category of the at least one category; or
  inserting a category between two other categories in the hierarchical categorization.

14. The method of claim 11, wherein determining the respective similarity between each of the at least one keyword of the set of keywords and each of the at least one category of the hierarchical categorization comprises:

using a sentence embedding algorithm to generate:
a respective first vector representation of each of the at least one keyword of the set of keywords; and
a respective second vector representation of each of the at least one category of the hierarchical categorization.

15. The method of claim 14, wherein determining the respective similarity between each of the at least one keyword of the set of keywords and each of the at least one category of the hierarchical categorization further comprises:
determining a respective pairwise cosine similarity between the respective first vector representation of each of the at least one keyword of the set of keywords and the respective second vector representation of each of the at least one category of the hierarchical categorization; and
when a particular one of the respective pairwise cosine similarity between a particular one of the respective first vector representation of a particular one of the at least one keyword of the set of keywords and a particular one of the respective second vector representation of a particular one of the at least one category of the hierarchical categorization is a highest one of the respective pairwise cosine similarity, determining that the particular one of the at least one category of the hierarchical categorization is the respective most likely category for the particular one of the at least one keyword of the set of keywords.

16. The method of claim 11, wherein the respective importance of each keyword of the set of keywords comprises at least one of:
revenue per click within a predefined time period for the keyword;
cost per click within a predefined time period or the keyword; or
total number of clicks within a predefined time period for the keyword.

17. The method of claim 11, wherein ranking each of the at least one keyword of the set of keywords comprises:
grouping each of the at least one keyword of the set of keywords with semantically similar keywords to create one or more clusters of keywords; and
ranking the one or more clusters of keywords.

18. The method of claim 17, wherein grouping each of the at least one keyword of the set of keywords comprises:
using a distance based agglomerative clustering algorithm.

19. The method of claim 11, wherein determining the respective first confidence level of the respective most likely category comprises:
determining a respective pairwise cosine similarity between a respective first vector representation of each of the at least one keyword of the set of keywords and a respective second vector representation of each of the at least one category of the hierarchical categorization.

20. The method of claim 19, wherein determining the respective first confidence level of the respective most likely category further comprises:
determining a divergence of (1) the respective most likely category in the hierarchical categorization for each of the at least one keyword of the set of keywords and (2) a second respective most likely category in the hierarchical categorization for each of the at least one keyword of the set of keywords.

* * * * *